US009465645B1

(12) United States Patent
Roth et al.

(10) Patent No.: US 9,465,645 B1
(45) Date of Patent: Oct. 11, 2016

(54) MANAGING BACKLOGGED TASKS (71) Applicant: Amazon Technologies, Inc., Reno, NV (US)

(72) Inventors: Gregory Branchek Roth, Seattle, WA (US); Bradley Jeffery Behm, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/314,315

(22) Filed: Jun. 25, 2014

(51) Int. Cl.
G06F 9/46 (2006.01)

(52) U.S. Cl.
CPC ..................................... G06F 9/46 (2013.01)

(58) Field of Classification Search
None
See application file for complete search history.

(56) References Cited

U.S. PATENT DOCUMENTS

| | | | |
|---|---|---|---|
| 7,716,275 B1* | 5/2010 | Nagaralu et al. ............. 709/203 |
| 8,015,327 B1* | 9/2011 | Zahavi et al. .................. 710/52 |
| 8,327,103 B1* | 12/2012 | Can et al. ...................... 711/165 |
| 8,539,493 B1* | 9/2013 | Robertson et al. ........... 718/103 |
| 8,826,280 B1* | 9/2014 | Robertson et al. ........... 718/100 |
| 2004/0117791 A1* | 6/2004 | Prasad et al. ................. 718/100 |
| 2004/0194095 A1* | 9/2004 | Lumb et al. .................. 718/100 |
| 2007/0256077 A1* | 11/2007 | Zhong .......................... 718/104 |
| 2007/0277173 A1* | 11/2007 | Tokimoto et al. ............ 718/100 |
| 2008/0222640 A1* | 9/2008 | Daly et al. .................... 718/103 |
| 2009/0019450 A1* | 1/2009 | Mori et al. .................... 718/105 |
| 2009/0063437 A1* | 3/2009 | Hendrey et al. .................. 707/4 |
| 2009/0113432 A1* | 4/2009 | Singh et al. ................... 718/102 |
| 2009/0235257 A1* | 9/2009 | Komatsu et al. .............. 718/101 |
| 2009/0288090 A1* | 11/2009 | Ujibashi et al. .............. 718/103 |
| 2010/0083253 A1* | 4/2010 | Kushwaha .................... 718/100 |
| 2010/0106816 A1* | 4/2010 | Gulati et al. .................. 709/223 |
| 2010/0229218 A1* | 9/2010 | Kumbalimutt et al. .......... 726/4 |
| 2010/0299669 A1* | 11/2010 | O'Cull et al. ................. 718/102 |
| 2011/0131580 A1* | 6/2011 | Krishnamurthy et al. ... 718/102 |
| 2011/0202924 A1* | 8/2011 | Banguero et al. ............ 718/103 |
| 2012/0079492 A1* | 3/2012 | Chambliss et al. ........... 718/104 |
| 2012/0096271 A1* | 4/2012 | Ramarathinam et al. .... 713/172 |
| 2012/0117075 A1* | 5/2012 | Gokulakannan ............... 707/741 |
| 2012/0159507 A1* | 6/2012 | Kwon et al. .................. 718/104 |
| 2012/0227052 A1* | 9/2012 | Larson et al. ................. 718/104 |
| 2013/0042250 A1* | 2/2013 | Lim et al. ...................... 718/103 |
| 2013/0070283 A1* | 3/2013 | Ikawa et al. ................. 358/1.14 |
| 2013/0185667 A1* | 7/2013 | Harper et al. ................. 715/772 |
| 2013/0219395 A1* | 8/2013 | Geibel et al. ................. 718/101 |
| 2013/0346992 A1* | 12/2013 | Sonoyama et al. ........... 718/102 |
| 2014/0025828 A1* | 1/2014 | Li et al. ........................ 709/226 |
| 2014/0165067 A1* | 6/2014 | Fiacco et al. ................. 718/102 |
| 2014/0237468 A1* | 8/2014 | Desai et al. ...................... 718/1 |
| 2014/0237477 A1* | 8/2014 | Cadambi et al. ............. 718/103 |
| 2014/0282512 A1* | 9/2014 | Pacheco et al. ................... 718/1 |
| 2014/0297833 A1* | 10/2014 | Bedini et al. ................. 709/224 |
| 2015/0033242 A1* | 1/2015 | Stepanchuk .................. 718/107 |
| 2015/0113540 A1* | 4/2015 | Rabinovici et al. .......... 718/104 |
| 2015/0121388 A1* | 4/2015 | Chang et al. ................. 718/103 |
| 2015/0128149 A1* | 5/2015 | Meijer et al. ................. 718/105 |
| 2015/0135183 A1* | 5/2015 | Kipp ............................. 718/103 |
| 2015/0150014 A1* | 5/2015 | Sar et al. ...................... 718/102 |
| 2015/0236973 A1* | 8/2015 | Jackson ........................ 709/226 |
| 2015/0254191 A1* | 9/2015 | Sukonik et al. .............. 711/106 |
| 2015/0262106 A1* | 9/2015 | Diao et al. ................... 705/7.37 |

* cited by examiner

Primary Examiner — Emerson Puente
Assistant Examiner — Mehran Kamran
(74) Attorney, Agent, or Firm — Davis Wright Tremaine LLP (57) ABSTRACT A method and apparatus for managing backlogged tasks are disclosed. In the method and apparatus, upon receiving a task pertaining to a requestor group, a number of outstanding tasks associated with the requestor group is determined and the task is submitted for processing if the number of outstanding tasks is within an allowable range. If the number of outstanding tasks is outside of the allowable range, take one or more actions may be taken, which may include rejecting the request.

21 Claims, 8 Drawing Sheets

MANAGING BACKLOGGED TASKS

BACKGROUND

In a service, client-initiated requests often result in the generation of tasks or various workloads for execution by computing systems or other computing resources that effectuate the service. In addition, satisfaction of the requests may be contingent on the completion of the tasks or the workloads. Furthermore, the timeliness of the completion of a task may change due at least in part to environmental conditions, such as the availability of computing resources to take up task execution, the computational complexity associated with the task and the number of tasks competing for the computing resources, among others. An undesirable effect of the dependence on the environmental conditions may be manifested in clients observing variability in the amount of time required for their requests to be satisfied.

It is often challenging to configure a computing system to provide predictability in request completion. Furthermore, it is also challenging to provide for fairness among the various clients of the computing system.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. Techniques described and suggested herein include managing backlogged tasks. In computing environments, a service may cause tasks to be submitted for execution. As described herein the service may be any type of service, such as a compute service, database service, storage service, identity management service, etc.

A task may be any command or instruction whose processing or completion requires computing operations to be performed. The task may have an outcome that is returned to a party initiating execution of the task or used as an argument (for example, an input) for another task. For example, the task may be a function call, such as an application programming interface (API) configured function call.

The execution of a task that is submitted by the service may rely upon or may be contingent upon the availability of computing resources for executing the task. The computing resources may be external to the service or may be part of the computing resources that make up the service or that are used to execute or implement the service. The task may be retained pending the computing resources becoming available. Further, others tasks (for example, previously submitted tasks) may be associated with a higher priority than the task at hand and, accordingly, the task at hand may be retained for a period of time awaiting the execution of the other higher priority tasks.

The service may submit a task for execution based at least in part on a request received from a customer of the service, whereby the customer may be any entity that utilizes the computing resources of the service. A customer request may be received by the service from a customer device, which may be a computer, server or host, among other types of devices. Satisfaction of the customer request may be predicated upon one or more tasks being executed. For example, if the service is an access management service that manages access to computing resources of the customer in an environment, the service may receive a request to change the access privileges associated with a user, whereby the user may be granted access privileges based at least in part on membership in the customer's organization. The change in access privileges may require that one or more tasks be executed. Upon execution, the one or more tasks may cause the changed access privileges to be propagated to the customer's computing resources throughout the environment.

As described herein, executing the one or more tasks and satisfying the customer's request may be dependent upon computing resources, such as servers, data stores or databases or network devices including routers, among others, being available to carry out the computing operations associated with the one or more tasks. Further, due at least in part to the fact that the available computing resources may be limited or may be subject to increased demand, the one or more tasks may be retained in a pending state awaiting execution. The amount of time that a task may be retained in a pending state may vary depending upon the number of tasks having higher execution priority than the task and the available resources to process the tasks. Further, the amount of time may also be dependent on the computational complexity associated with the tasks, whereby as the computational complexity increases, the amount of time or number of resources allotted for processing the tasks increase thereby precluding usage of the resources for processing the task. The task may be executed in a workflow system. Furthermore, while the task is in a pending state, the execution of the task may not have begun or may not have been initiated. Depending on the conditions within an environment, the amount of time by which a task may remain outstanding pending execution may vary. The variation results in variability in the time required to satisfy a customer's request.

It is desirable to offer predictability in the time required for a task to be executed or for a customer request to be satisfied. Further, it is also desirable to ensure that allocation of computing resources among customers is fair. For example, it may be undesirable that a customer that actively submits requests to the service cause the processing of requests submitted by other less active customers to be overly delayed.

Upon receiving a request from a customer, the service may be configured to determine whether the request causes one or more tasks to be submitted for execution. The execution of the one or more tasks may be performed asynchronously in relation to the received request. If the request does in fact necessitate that the one or more tasks be submitted for execution, the service may be configured to determine a latency associated with presently pending tasks. The latency may be determined as the difference between the present time and the submission time of the earliest submitted pending task. The latency may be an indicator of the amount of time a submitted task may be expected to remain pending awaiting execution.

The latency may be used as an indicator of the number of tasks that a customer, a group of customers or any other grouping of requestors may have pending at any point in time. As the latency increases, the number of pending tasks should be reduced. However, as the latency decreases, the number of pending tasks may be increased due at least in part to the fact that a low latency indicates that a system is capable of absorbing a rate of requests.

A threshold of a tolerable latency may be established. The threshold may be informed by a service level agreement (SLA) or a quality-of-service (QoS) requirement and may represent a maximum acceptable latency beyond which specified limits (or further limits) may be imposed on the number of requests that are accepted from customers or the number of tasks that a customer or a grouping of requestors may have in a pending state. For example, a customer or a grouping of requestors may be guaranteed a minimum number of tasks (or a quota) that the customer or the grouping may have in a pending state. However, if conditions are more favorable (for example, the latency of pending tasks is low or below the established threshold), the customer or the grouping of requestors may be permitted to have a higher number of tasks pending execution.

Figure 1:
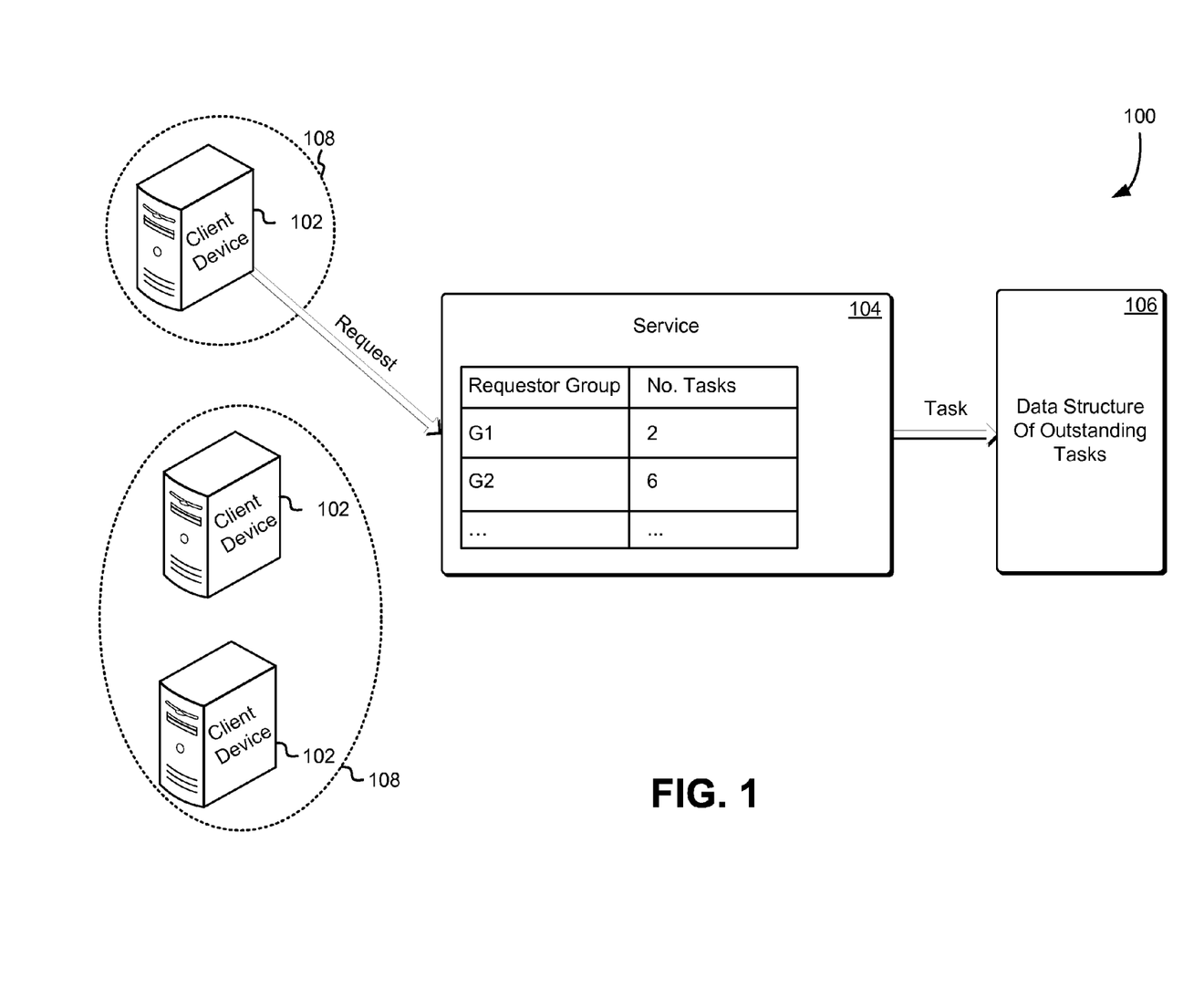
FIG. 1 shows an example of a computing environment in accordance with at least one embodiment.

FIG. 1 shows an example of a computing environment in accordance with at least one embodiment. The environment 100 includes a plurality of client devices 102, a service 104 and a data structure of outstanding tasks 106. The client devices 102, which may be any type of computing devices, such as computers, servers or services, among others, may submit requests to the service 104. The requests may be received by the service 104 and processed to identify one or more tasks that are to be performed in order for the requests to be satisfied. A task may be any type of computing operation and in various embodiments, the task may specify that a remote computing device is to be launched or that data is to be written to the memory of the remote computing device, among many others. The service 104 may identify a latency or time lag associated with outstanding tasks that are retained in the data structure 106, which may be a queue, among others. The latency may be indicative of a time delay that may be experienced by a submitted task prior to execution.

To ensure that the allocation of resources among clients of the service 104 is fair and to ensure that latency is predictable, the service 104 may be configured to utilize the latency to determine a limit of a number of tasks that a requestor group 108 may have pending at a given point in time. A requestor group 108 may include any number of clients of the service 104. Further, a client may be associated with one or more requestor groups 108. For example, the client may be an organization having a plurality of users and a subset of the users may be part of a requestor group 108. If the limit of the number of tasks associated with the requestor group 108 is not exceeded, the service 104 may submit the task for execution. Conversely, if the limit is exceeded, the service 104 may deny submitting the request and send indication to the client device 102 that their limit has been exceeded. In response, the client device 102 may resubmit the request at a later time or request that their limit be increased to accommodate the request.

Figure 2:
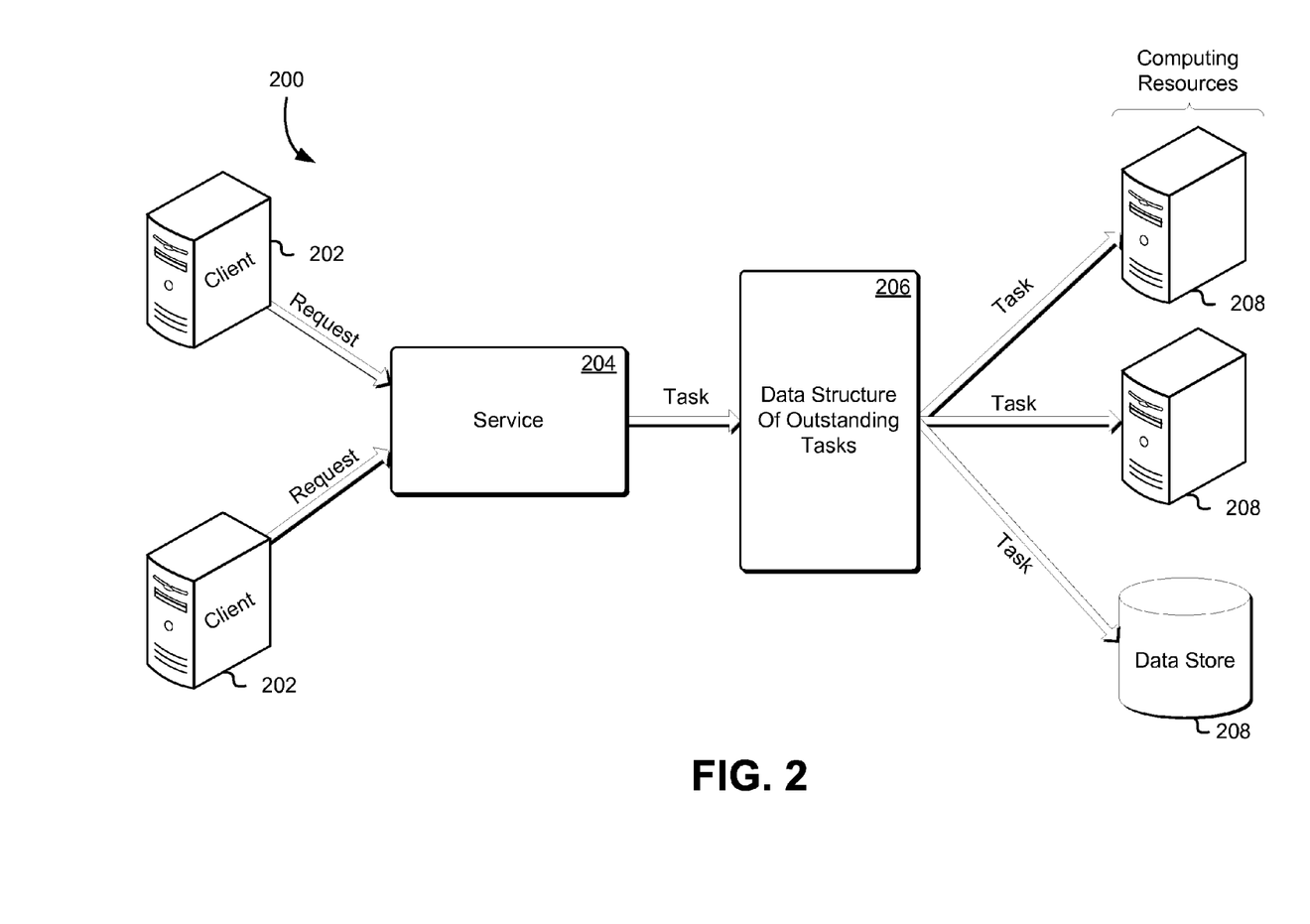
FIG. 2 shows an example of a computing environment in accordance with at least one embodiment.

FIG. 2 shows an example of a computing environment in accordance with at least one embodiment. In the environment 200, a service 204 receives a request to perform one or more actions from a client 202. The service 204 may be any type of service that is configured to receive the request from the client 202 and cause the request to be handled, processed or satisfied as appropriate. As used herein, unless otherwise stated or clear from context, the service 204 may be a computer system program, process, client, server, application, module, operating system entity, controlling domain or combinations of these and other such computer system entities. The collection of computing resources may be a client and/or a server and in some embodiments may be configured to send and/or receive communications, data, requests and/or other such requests to and/or from other services within the computer system. The request may, for example, be an appropriately configured application programming interface (API) function call, among others. Receipt of the request by the service 204 may necessitate one or more actions to be performed. For example, the request or the client 202 may be initially authenticated to ensure that the client 202 is permitted or authorized to submit the request or is permitted or authorized to seek one or more actions associated with the request to be performed. In addition to authentication, the satisfaction of the request may be subject to the one or more actions associated with the request being performed by the service 204 or another entity.

The client 202 may be any computing resource, such as a laptop or desktop computer, among others. The client 202 may be used by a customer of the service 204 to receive one or more services provided by the service. Further, the client 202 may be another service as described herein. In various embodiments, the service 204 may be an access management service that manages access to one or more computing resources of the client 202. The client 202 may submit a request to the service 204 to change access configurations associated with a customer's account or a customer's computing resources. For example, the request may specify that access privileges associated with one or more users pertaining to the customer's account is to be modified. Further, the service 204 may be a virtual service that allocates virtual computing resources that are instantiated utilizing underlying hardware resources to a customer. The customer may, for example, utilize the client 202 to increase or decrease the resources allocated to the customer by submitting a request to increase or decrease the resources allocated to the customer. As described herein, the request submitted by the client may be an API configured function call.

For the request to be satisfied the service 204 may perform one or more actions synchronously in relation to the received request. A synchronously performed action may have a tightly coupled timing relationship with the request, whereby, for example, receipt of the request may trigger performing the action within a time frame or with predictable latency in relation to receiving the request. Authenticating the request or a party submitting the request may be performed synchronously. Further, in addition to performing the one or more actions synchronously with respect to the request, the service 204 may cause one or more other actions to be performed asynchronously to satisfy the request. The asynchronously performed actions may be backlogged and their performance may be pending that conditions within the environment be met. For example, performance of the one or more actions may be subject to computing resources being available to execute the actions. The asynchronously performed actions may be performed in order for the request to be satisfied or to propagate a requirement of the request in the environment 200 or in a system.

To trigger performing the one or more actions, the service 204 may cause a task to be placed in a data structure 206 of outstanding tasks. The task may include instructions for performing the one or more actions. Further, the instructions may be processed or executed by one or more computing resources. The data structure 206 may be a queue, ring buffer or any type of memory. The data structure 206 may retain the task until one or more computing resources 208 are available to process or execute the task and cause completion or satisfaction of the one or more asynchronously performed actions. Although one data structure is shown in FIG. 2, it may be recognized that tasks may be retained in a plurality of data structures that may be distributed in a computing system. For example, each plurality of computing resources 208 may be associated with a data structure 206 that retains tasks for execution by the computing resources 208.

In addition to the task, the data structure 206 may retain other tasks, and each retained task in the queue may be associated with a priority. The priority may, for example, be a function of the time of receipt, by the service 204, of a request that triggered execution of the task or the time at which the task is added to the data structure 206. In various embodiments, an earlier time necessitates a higher priority associated with the task.

Upon the task being sent to the one or more computing resources 208 for processing or execution or after completion of a portion or all of the processing or execution, the task may be removed from the data structure 206. The length of time the task remains in the data structure 206 awaiting execution may be dependent on or a function of several factors including the number of tasks that are retained in the data structure 206 (for example, that are submitted, slatted or queued for execution ahead of the task) or the computational resources required for the tasks to be wholly or partially processed or executed. Accordingly, assuming the computing resources required for task processing are the same for all tasks in the data structure 206, if the data structure 206 only includes a small number of outstanding tasks, a task submitted to the data structure 206 may be processed more expediently than if the data structure 206 includes a large number of outstanding tasks.

As described herein, in the environment 200, the amount or capability of the computing resources 208 available for task processing varies in time, whereby computing resources 208 may be added to join the system or may fail or be removed and, thus, exit the system. In addition, the computing capability required to process a pending task varies depending on the task. Further, the length of time a task remains pending processing varies depending on the number of tasks having higher processing priority in the data structure 206.

It is desirable to have predictable latency associated with task processing, whereby the amount of time a task is retained pending processing or execution is kept within a known limit. Further, it is desirable to have fairness in allocating computing resources 208 for task processing. It is desirable that the computing resources 208 available for task processing be fairly distributed among the clients 202 and their associated requests. When the computing resources 208 are highly contested, it is desirable to have a mechanism to ensure that a client 202 submitting a large number of requests does not cause the system to be overwhelmed so as to exclude the requests of other clients 202 or their associated tasks from being processed by the computing resources 208. Accordingly, it is desirable that available computing resources 208 be fairly divided among the clients 202 particularly when the computing resources are scarce.

Figure 3:
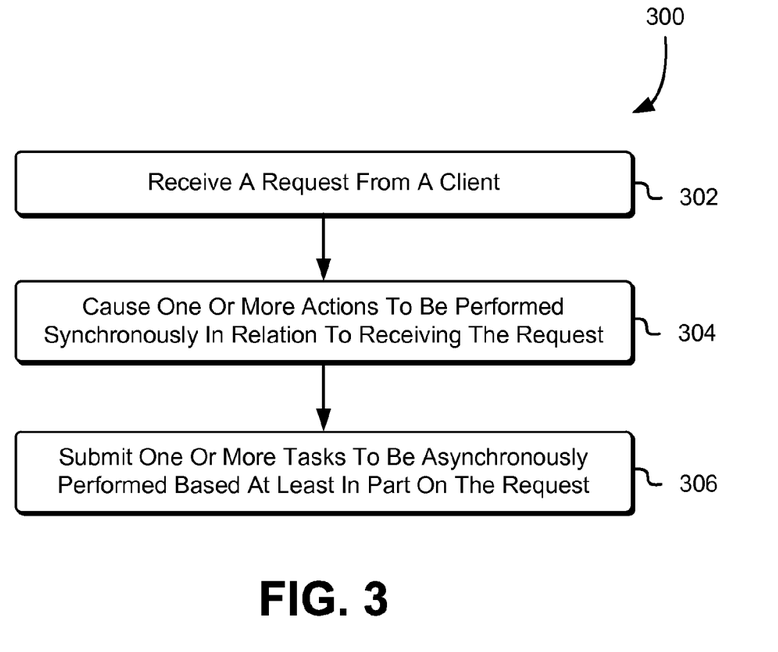
FIG. 3 shows an example of a method for request evaluation in accordance with at least one embodiment.

FIG. 3 shows an example of a method for request evaluation in accordance with at least one embodiment. In the process 300, a service, such as the service described with reference to numeral 204 in FIG. 2, receives 302 a request from a client. A set of actions may be required to be performed in order for the request to be satisfied as described herein. A described herein, the service may be an access management service and the request may specify that access privileges associated with one or more users are to be changed. Further, the service may be a virtual computer system service and the request may specify that one or more virtual servers are to be instantiated for use by a customer. The service causes 304 one or more actions to be performed synchronously in relation to receiving the request. The one or more actions may include persisting or storing the request, which may be an API function call as described herein.

The service then submits 306 one or more tasks to be asynchronously performed based at least in part on the request. For example, if the service is an archival storage service and the request specified that a data volume is to be retrieved, the one or more tasks may include retrieving various portions of the data volume from a plurality of data stores, performing decoding, decompression or decrypting operations on the portions of the data volume and mounting the data volume, among others. Designating the one or more tasks may include placing the one or more tasks in data structure, such as a queue, to be completed by one or more computing resources.

One or more tasks retained in the data structure may each be associated with a timestamp, whereby the timestamp may represent a reference to the time at which the task was included in the data structure or submitted for processing or execution. Further, the timestamp may represent a reference to the time a request that prompted submission of the task for execution. The timestamp may be used determine a processing time lag associated with tasks retained by the data structure. The time lag of the data structure may be determined as the difference between a present time and the timestamp of an earliest submitted task to the data structure (or one of a set of earliest submitted tasks). The time lag of the data structure is inversely proportional to the rate at which tasks are retrieved from the data structure for processing but proportional to the rate at which tasks are added to the data structure. The time lag may be indicative of a level of expeditiousness or promptness associated with task evaluation in an environment. If the time lag increases, the environment may be deemed not to react as quickly in accordance with received requests. Furthermore, if the time lag is small, it may be determined that the environment causes tasks to be expeditiously sent for execution.

The time lag may be used to determine a level of quality-of-service (QoS) or service level agreement (SLA) that may be provided to users and customers alike. Further, controlling the submission or execution of tasks based at least in part on the time lag may be used to provide predictable performance for customers or users. In addition, to provide for fairness among customers or clients (or grouping of customers or clients), the number of permissible requests may be limited based at least in part on the time lag associated with pending tasks.

Figure 4:
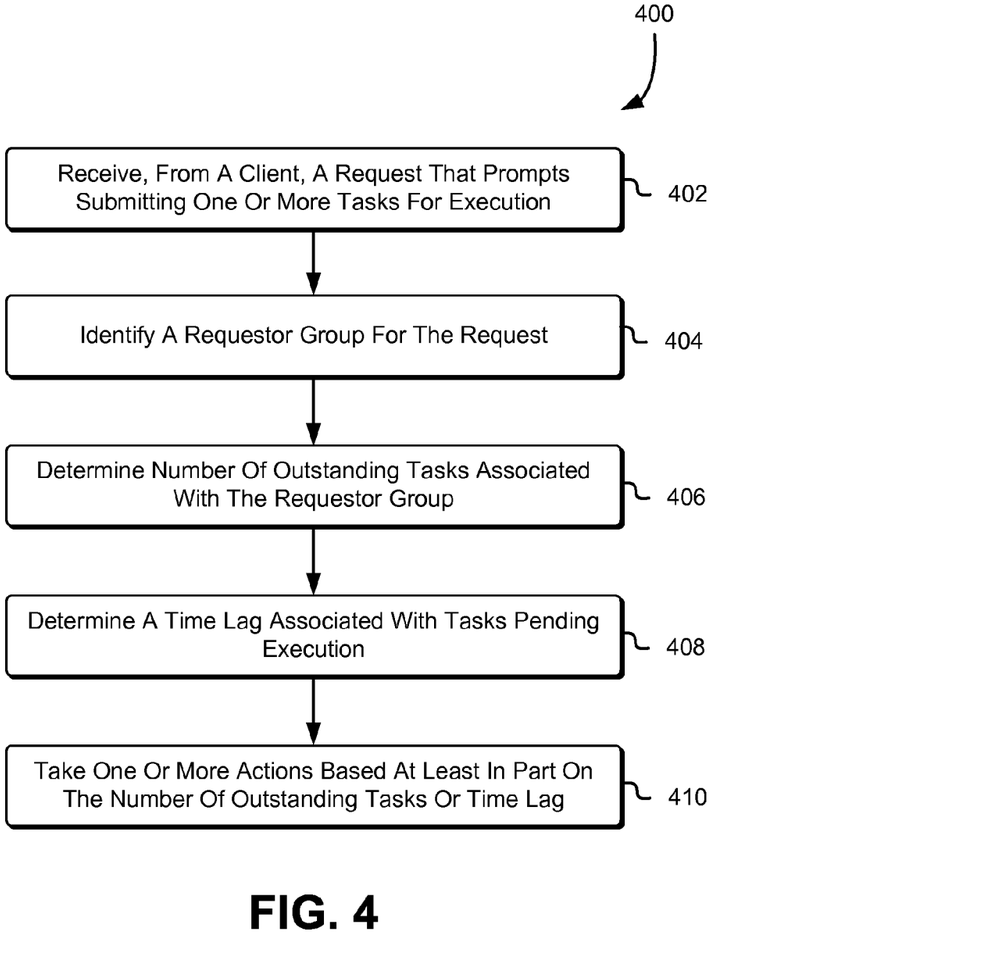
FIG. 4 shows an example of request evaluation in accordance with at least one embodiment.

FIG. 4 shows an example of request evaluation in accordance with at least one embodiment. In the process 400, a service, such as the service described with reference to numeral 204 in FIG. 2, receives 402 a request from a client, whereby the request prompts submitting one or more tasks for execution. The service identifies 404 a requestor group for the request. The requestor group may be based at least in part on an identity of a party submitting the request. Each customer of the service may be part of an independent requestor group, whereby a customer may be grouped individually in a requestor group. Further, a requestor group may pertain to a plurality of customer. In addition, one or more users of a customer's account with the service may be included in a requestor group.

The service then determines 406 a number of outstanding tasks associated with the identified requestor group. The number of outstanding tasks may be the number of tasks that are submitted by members of the requestor group and that are retained awaiting execution in a data structure, such as the data structure described with reference to numeral 206 in FIG. 2. The number of outstanding tasks associated with the requestor grouping may be determined in order to identify whether a limit or a quota of a number of outstanding tasks for the requestor group has been reached. In order to ensure fairness in allocating task execution resources among requestor groups, one or more limits on the number of outstanding tasks for a requestor group may be set. Further, the one or more limits may vary depending on the lag time associated with tasks pending execution. Determining the number of outstanding tasks associated with the identified requestor group may be performed probabilistically. For example, retained tasks may be sampled in order to probabilistically determine the number of outstanding tasks or an amount of outstanding work for a system. The outstanding tasks may be equally distributed among processing or execution engines. Determining a total number of outstanding tasks may be performed by sampling the number outstanding tasks for one engine or for a subset of engines and extrapolating the determined number for an entire system to arrive at the total number of outstanding tasks. Further, any measure of the amount of outstanding tasks may be used. For example, instead of determining a number of outstanding tasks, it may be determined whether the amount of outstanding tasks falls within one of a number of categories, whereby a category may be used to indicate a level of workload the outstanding tasks place on the system.

The service then determines 408 a lag time associated with tasks pending execution. As described herein, the lag time may be calculated as a difference between the time when the lag time (for example, the present time) and the time when the earliest pending task was submitted to the data structure. The service takes 410 one or more actions based at least in part on the number of outstanding tasks or the time lag. The one or more actions may include denying the request and providing an indication to a requestor that the request is denied. Further, the one or more actions may include permitting evaluation of the request and submitting one or more tasks for execution.

Figure 5:
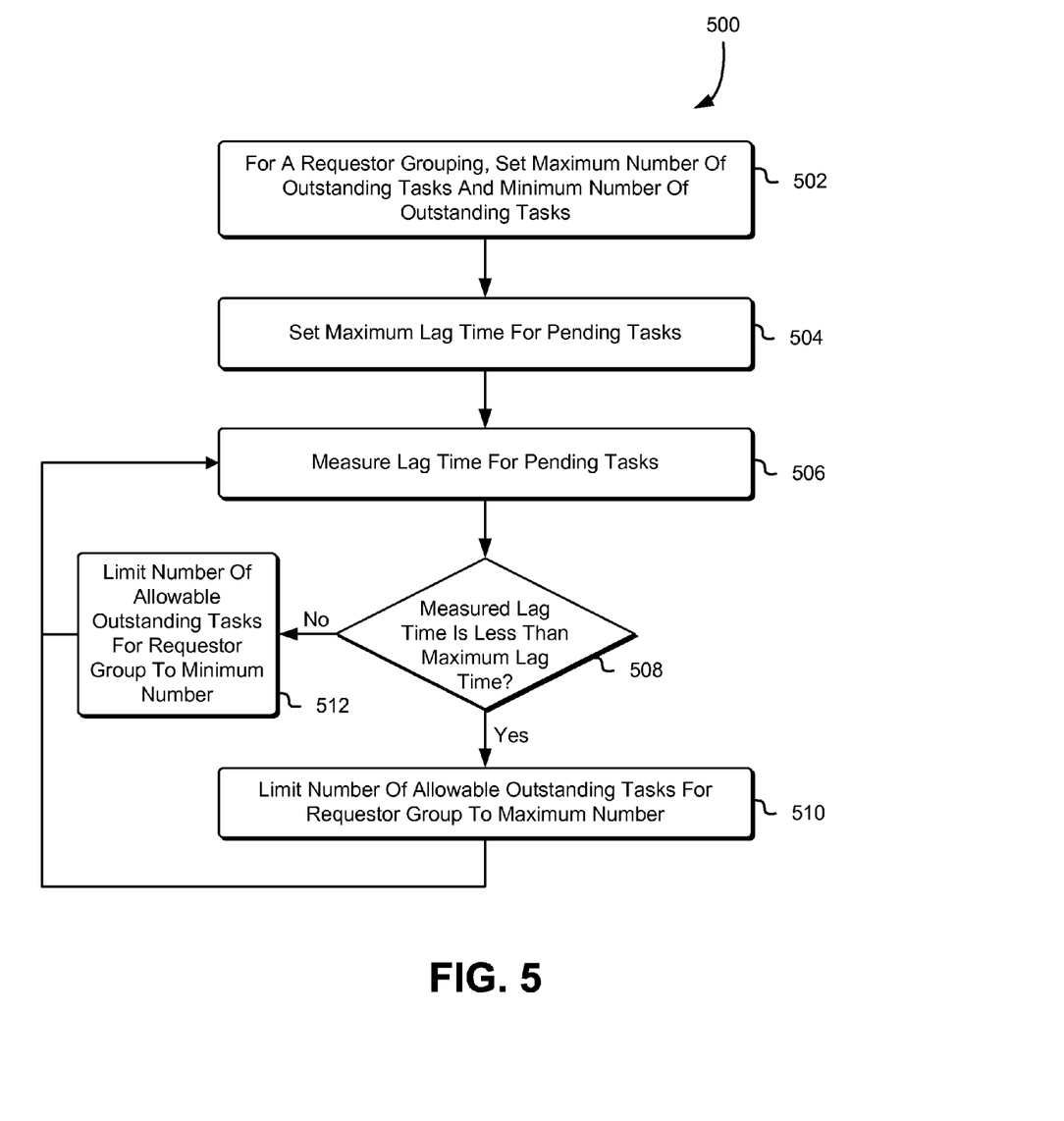
FIG. 5 shows an example of a method for limiting a number of allowable outstanding tasks for a requestor group in accordance with at least one embodiment.

FIG. 5 shows an example of a method for limiting a number of allowable outstanding tasks for a requestor group in accordance with at least one embodiment. In the process 500, a service, such as the service described with reference to numeral 204 in FIG. 2, sets 502 a maximum number of outstanding tasks and a minimum number of outstanding tasks for a requestor group. The maximum number of outstanding tasks may a higher bound on the number of tasks that may be pending execution for a requestor group at any given point in time. For example, under favorable conditions, such as when the rate at which tasks are retrieved for execution is high, a requestor group may not have more outstanding tasks than is permitted per the maximum number of outstanding tasks. The usage of the maximum number of outstanding tasks is advantageous in that it limits the potential that an active requestor group (for example, a requestor group that submits a large number of requests and prompts generating tasks for execution) overwhelms a system or causes a lag time associated with pending tasks to increase. If the number of outstanding tasks for a requestor group is not bounded, other less active requestor groups may also be shut out or precluded from timely evaluation of their requests.

Similarly, the minimum number of outstanding tasks for the requestor group may be put in place in order to guarantee, under all conditions, that the requestor group may have at least the minimum number of tasks being pending. In some embodiments, the minimum number of outstanding tasks may be one, whereby each requestor group is guaranteed to have one pending task at any point in time.

The service then sets 504 a maximum lag time for pending tasks. The maximum lag time may be a maximum acceptable amount of time for a task to remain pending before being retrieved for execution. The maximum lag time may be based at least in part on a QoS or SLA requirement. The established maximum lag time may be used as a threshold and may be compared to a measured lag time for the pending tasks to serve as an indication of the conditions in an environment. When the measured lag time is less than the established maximum lag time, it may be concluded that the number of pending tasks may be increased while maintaining an SLA requirement. Accordingly, a requestor group may be allowed to submit more requests that will translate into the addition of more pending tasks. When the measured lag time is greater than the established maximum lag time, it may be concluded that the number of pending tasks should be decreased in order to meet the SLA requirement. Accordingly, a requestor group may be limited to the minimum number of outstanding tasks.

The service measures 506 a lag time for the pending tasks and determines 508 whether the measured lag time is less than (or equal to) the maximum lag time. If the measured lag time is determined to be less than (or equal to) the maximum lag time, the service limits 510 the number of allowable outstanding tasks for the requestor group to the established maximum number. Accordingly, the requestor group is permitted to utilize a maximum permitted capacity allocated to the requestor group. If the measured lag time is not determined to be less than (or equal to) the maximum lag time, the service limits 512 the number of allowable outstanding tasks for requestor group to the minimum number. As described herein, the minimum number of outstanding tasks may be one, whereby the requestor group may only be permitted to have one pending task at any point in time among the group of pending tasks. It is noted that permitting a requestor group to have one or more pending tasks when the measured lag time is greater than the maximum lag time may cause the lag time to increase. That is due to the fact that the requestor group is guaranteed the minimum number of outstanding tasks and, accordingly, a requestor group having no pending tasks may be permitted to submit a task thereby potentially contributing to increasing the lag time.

Following setting a limit of the number of outstanding tasks a requestor group may have pending at any point in time, the limit may be used to accept or reject requests received from a client associated with the requestor group. If requestor group's quota is exceeded, an incoming request may be rejected and a notification may be provided to the client submitting the request. Furthermore, if a requestor group's quota is not exceeded, a request is accepted and one or more tasks associated with the request are submitted for execution.

Figure 6:
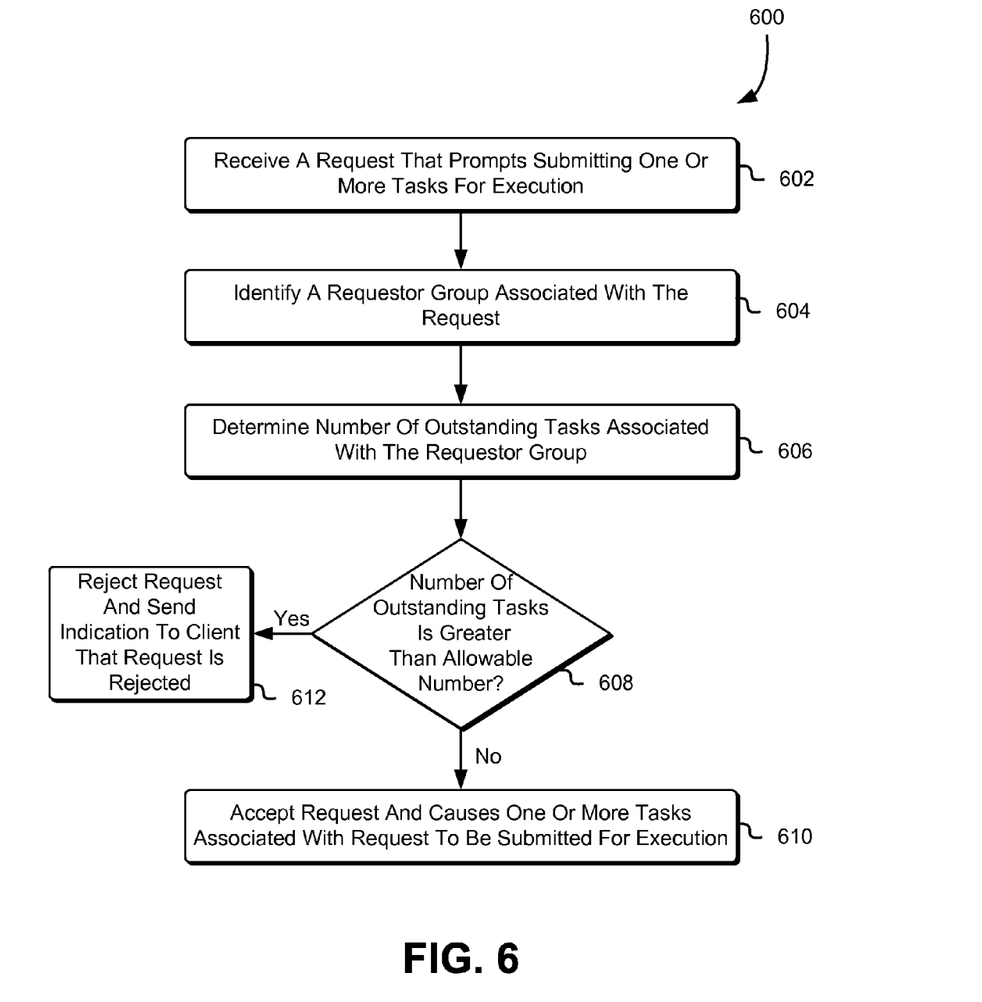
FIG. 6 shows an example of a method for evaluating whether a received request is accepted in accordance with at least one embodiment.

FIG. 6 shows an example of a method for evaluating whether a received request is accepted in accordance with at least one embodiment. In the process 600, a service, such as the service described with reference to numeral 204 in FIG. 2, receives 602 a request that prompts submitting one or more tasks for execution. As described herein, the one or more tasks may be executed asynchronously in relation to the received request. The service then identifies 604 a requestor group associated with the request. The requestor group may be identified based at least in part on an identity of a party submitting the request. Further, the identification may be performed as part of authenticating the request or authenticating the party submitting the request, whereby the authentication may include confirming credentials associated with the requestor. For example, the request may be signed using a signature that is a key pertaining to a party submitting the request, and the party submitting the request may be identified based at least in part on the signature.

The service then determines 606 a number of outstanding tasks associated with the requestor group. The number of outstanding tasks represents the requestor group's share of the total number of outstanding tasks. The service then determines 608 whether the number of outstanding tasks is greater than the allowable number of outstanding tasks for the requestor group. The allowable number of outstanding tasks for the requestor group is established as described with reference to numerals 510 and 512 in FIG. 5. If the service determines that the number of outstanding tasks is not greater than the allowable number of outstanding tasks for the requestor group, the service accepts 610 the request and causes one or more tasks associated with the request to be submitted for execution. As described herein, submitting the one or more tasks for execution may include providing the one or more tasks to a data structure. Other tasks may have a higher priority for execution than the one or more submitted tasks. The one or more tasks may be retrieved for execution upon retrieval of all higher priority tasks from the data structure.

If the service determines that the number of outstanding tasks is greater than the allowable number of outstanding tasks for the requestor group, the service rejects 612 the request and sends an indication to a client that the request is rejected. The indication may specify that the request is rejected due to the fact that a task quota or limit for the requestor group has been reached.

It is noted that the disclosed techniques for managing backlogged work or tasks are advantageous in that they adapt throttling the requests or tasks in a dynamically changing environment. For example, techniques that fix or limit the number of requests or tasks a client may have regardless of environment conditions may not be well suited for environments where the processing time for task execution varies between tasks and the computing resources available for processing the tasks vary over time. As described herein, the number of pending requests or tasks for a client may be made to be self-adjusting based at least in part on a lag time or delay associated with pending tasks, whereby if a data structure is quickly "drained" of pending tasks resulting in a low time lag for pending tasks, members of a requestor group may be permitted to increase the number or the rate of submitted tasks. Conversely, if pending tasks are not quickly retrieved from the data structure resulting in a high time lag, members of a requestor group may be forced to decrease the number of submitted tasks or requests.

In at least one embodiment, a customer may receive, on a customer device, an indication of the number of pending requests or tasks that the customer may have at any point in time. For example, a console on the customer device may be used to provide the information to the customer. Further, the customer may be provided with an option to request that the limit be increased or changed. A fee may be associated with increasing or changing the customer's limit, whereby a customer may be required to make a monetary payment (for example, according to a fee schedule) in order to be allocated more capacity. Further, the customer may be provided with instructions or directions for obtaining an increase to their capacity to submit requests.

In some embodiments, the customer may be provided with the option of cancelling a request or replacing the request with another request. For example, the customer may have submitted a first request that caused the limit of allowable pending requests or tasks associated with the customer to be reached. If the customer is prevented from submitting a second request for processing due at least in part to the fact that the limit is reached, the customer may be provided with the option of cancelling the first request. For example, the customer may be provided with the option to select a request for cancellation from a plurality of pending requests. Upon cancellation of the first request, the customer may have available capacity and may subsequently submit the second request.

Figure 7:
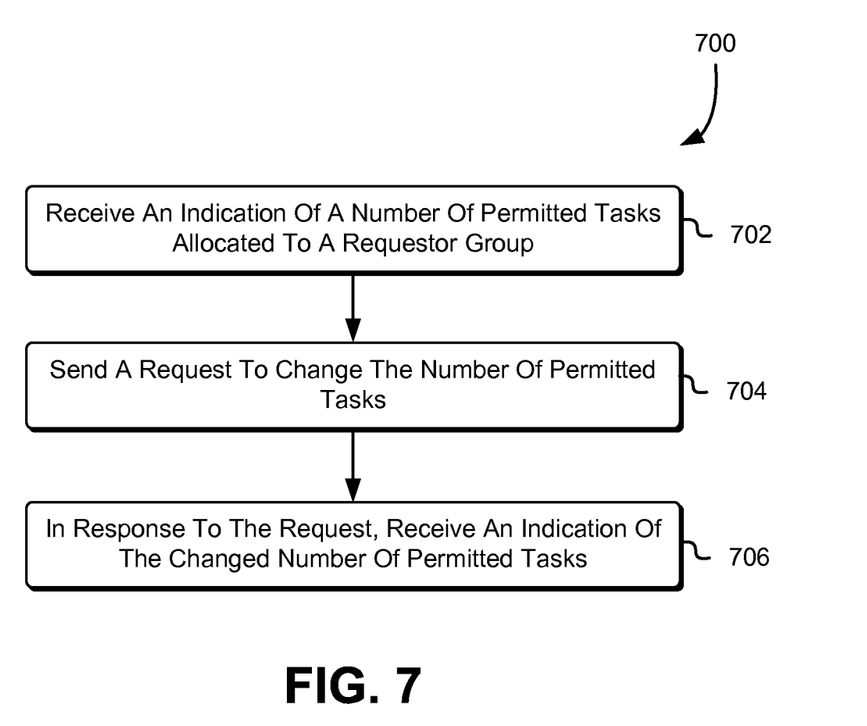
FIG. 7 shows an example of a method for requesting a change to the number of tasks allocated to a requestor group in accordance with at least one embodiment.

FIG. 7 shows an example of a method for requesting a change to the number of tasks allocated to a requestor group in accordance with at least one embodiment. In the process 700, a client device, such as the client device described with reference to numeral 202 in FIG. 2, receives 702 an indication of a number of permitted tasks allocated to a requestor group. The client device may belong to a customer that is a member of the requestor group, and the indication may be provided to inform the customer of the number of tasks that the customer may have pending at any given point in time. The customer may seek to increase the number of tasks in order to permit submitting a larger number of requests to a service. The client device then sends 704 a request to change the number of permitted tasks. The request may be sent to the service as described herein. Further, the request may specify a desired increase of the number of tasks allocated to the requestor group. In exchange for increasing the number of tasks, the customer may be charged a monetary fee as described herein.

In response to sending the request, the client device receives 706 an indication of a changed number of permitted tasks allocated to the requestor group. The client device or any other device associated with the customer or the requestor group may submit tasks for execution in accordance with the new number of allocated tasks for the requestor group. In addition, if the demand on task execution decreases, the client device or another device may submit a request to decrease the number of pending tasks the requestor group may have.

Figure 8:
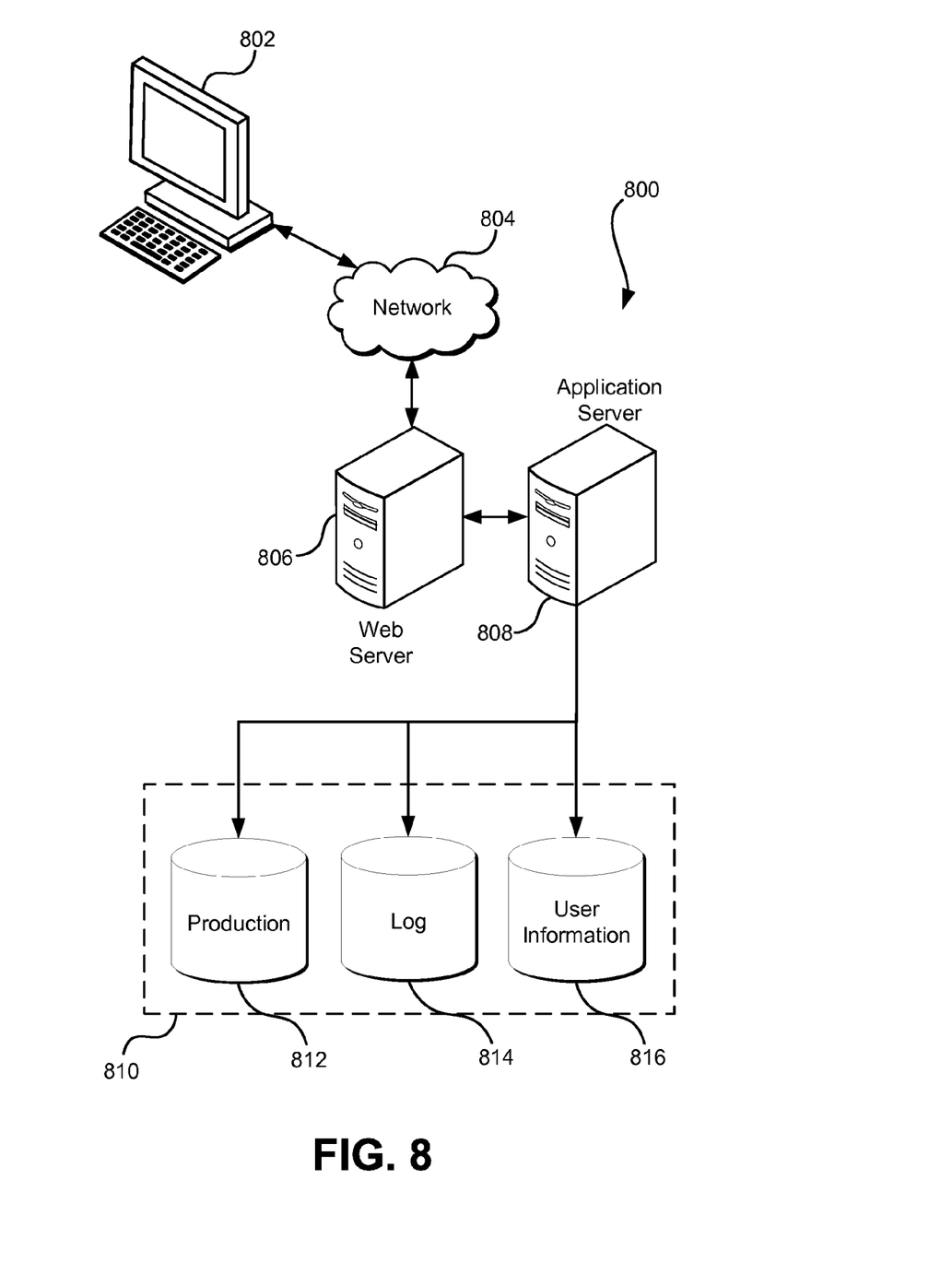
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 802 and the application server 808, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for managing task execution, comprising:
   under the control of one or more computer systems configured with executable instructions,
      receiving a request, fulfillment of the request involving execution of one or more tasks;
      determining a requestor group associated with the request, the requestor group being a grouped set of request-initiating entities;
      determining a number of outstanding tasks for the requestor group;
      identifying a limit of a number of outstanding tasks for the requestor group, the limit of the number of outstanding tasks being changeable based at least in part on a time lag of one or more pending tasks and bounded at least by a minimum guaranteed number of pending tasks for the requestor group when the lag time is equal to or above a threshold, the time lag being a measure of a duration of time between submission of a pending task of the one or more pending tasks for execution and an initiation of the execution of the pending task; and
      taking one or more actions based at least in part on determining that the number of outstanding tasks for the requestor group is non-compliant with the limit of the number of outstanding tasks, the one or more actions including declining fulfillment of the request.

2. The computer-implemented method of claim 1, wherein taking the one or more actions further include sending information indicative of the number of outstanding tasks associated with the requestor group or an estimated amount of time of when a resubmitted request is fulfillable.

3. The computer-implemented method of claim 1, further comprising:
   receiving a second request, fulfillment of the second request involving execution of one or more other tasks;
   determining a second number of outstanding tasks for a requestor group associated with the second request;
   identifying a second limit of a number of outstanding tasks for the requestor group associated with the second request; and
   submitting the one or more other tasks for execution based at least in part on determining that the second number of outstanding tasks is compliant with the second limit.

4. The computer-implemented method of claim 1, wherein:
the requestor group includes a customer of a computing resource service provider, the customer having an associated capacity that subdivided among for allocation to one or more users; and
the request is received from a user of the one or more users.

5. The computer-implemented method of claim 1, wherein the limit of the number of outstanding tasks is further bounded by a second number of pending tasks, the second number being greater than the minimum guaranteed number.

6. A system, comprising:
at least one computing device configured to implement one or more services, wherein the one or more services are configured to:
for a task pertaining to a requestor group, determine a set of pending tasks for the requestor group, the requestor group including a set of request-initiating entities and fulfillment of a request initiated by a corresponding request-initiating entity of the requestor group being contingent upon execution of the task;
submit the task for execution on a condition that the determined set of pending tasks satisfies one or more acceptability criteria, the one or more acceptability criteria limiting a number of pending tasks of the set of pending tasks to a number of pending tasks, the number of pending tasks being bounded at least by a minimum guaranteed number of pending tasks for the requestor group on condition that a time delay associated with the set of pending tasks is equal to or above a first threshold; and
take one or more actions different from submitting the task for execution on a condition that the set of pending tasks fails to satisfy the one or more acceptability criteria.

7. The system of claim 6, wherein the set of pending tasks is a set of asynchronous tasks.

8. The system of claim 6, wherein the set of pending tasks are pending execution in a workflow system.

9. The system of claim 6, wherein the one or more services are further configured to determine the one or more acceptability criteria based at least in part on a number of outstanding tasks in the set of pending tasks.

10. The system of claim 6, wherein the one or more acceptability criteria are further limited on condition that a time delay associated with the set of pending tasks is below a second threshold.

11. The system of claim 6, wherein the one or more actions include sending, to a requestor associated with the task, at least one of an indication that submission of the task for execution is not performed, information indicative of the number of pending tasks associated with the requestor group or an estimated amount of time of when a resubmitted request is fulfillable.

12. The system of claim 6, wherein the one or more services are further configured to receive a request to increase a limit on the guaranteed number of pending tasks associated with the requestor group.

13. The system of claim 6, wherein the one or more services are further configured to determine the task in response to at least receipt of a web-services request from a customer.

14. The system of claim 6, wherein the number of pending tasks is further bounded by a second number of pending tasks, the second number being greater than the minimum guaranteed number.

15. A non-transitory computer-readable storage medium having stored thereon executable instructions that, when executed by one or more processors of a computer system, cause the computer system to at least:
determine a requestor group associated with a task, the requestor group including a set of request-initiating entities;
determine whether a measure of outstanding tasks associated with the requestor group is within a permissible range, the measure of outstanding tasks including a lag time of an outstanding task of the outstanding tasks, the lag time being an amount of time that the outstanding task is retained prior to initiation of execution of the outstanding task, the permissible range being bounded at least by a minimum guaranteed number of outstanding tasks for the requestor group on a condition that the lag time is equal to or above a threshold; and
cause the task to be sent for execution on a condition that the measure of outstanding tasks associated with the requestor group is within the permissible range.

16. The non-transitory computer-readable storage medium of claim 15, wherein:
the outstanding task is retained in a data structure pending execution; and
the instructions that cause the computer system to cause the task to be sent for execution further include instructions that cause the computer system to cause the task to be included in the data structure.

17. The non-transitory computer-readable storage medium of claim 15, wherein the permissible range is bounded by the guaranteed number of outstanding tasks on a condition that the lag time is less than or equal to a second threshold.

18. The non-transitory computer-readable storage medium of claim 15, wherein the instructions further comprise instructions that, when executed by the one or more processors, cause the computer system to, in response to receiving a request to increase the permissible range, increase the permissible range to allow more tasks associated with the requestor group to be submitted for execution.

19. The non-transitory computer-readable storage medium of claim 15, wherein the instructions further comprise instructions that, when executed by the one or more processors, cause the computer system to, in response to receiving a request to increase the permissible range, increase the guaranteed number of outstanding tasks for the requestor group.

20. The non-transitory computer-readable storage medium of claim 19, wherein the request is received from a request-initiating entity of the set of request-initiating entities.

21. The non-transitory computer-readable storage medium of claim 15, wherein the permissible range is further bounded by a second number of outstanding tasks, the second number being greater than the minimum guaranteed number.

* * * * *